United States Patent
Chang

(10) Patent No.: US 7,091,987 B2
(45) Date of Patent: Aug. 15, 2006

(54) PATTERNING AND DOT GAIN IMPROVEMENT FOR VECTOR ERROR DIFFUSION

(75) Inventor: Ching-Wei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 42 days.

(21) Appl. No.: 10/909,576

(22) Filed: Aug. 2, 2004

(65) Prior Publication Data

US 2006/0022998 A1 Feb. 2, 2006

(51) Int. Cl.
*G09G 5/00* (2006.01)

(52) U.S. Cl. .................. 345/616; 345/602; 382/252; 382/253

(58) Field of Classification Search ................ 341/106; 345/601, 602, 616, FOR. 122; 347/184; 358/3.03, 3.04, 3.05; 382/252, 253; 702/162; 704/256.8; 708/235; 714/759
See application file for complete search history.

(56) References Cited

U.S. PATENT DOCUMENTS

| | | | |
|---|---|---|---|
| 5,070,413 A | 12/1991 | Sullivan et al. | |
| 5,194,878 A * | 3/1993 | Murakami et al. | 347/115 |
| 5,621,545 A | 4/1997 | Motta et al. | |
| 5,621,546 A | 4/1997 | Klassen et al. | |
| 5,784,077 A * | 7/1998 | Silverbrook | 347/2 |
| 5,838,389 A * | 11/1998 | Mical et al. | 348/650 |
| 6,072,591 A | 6/2000 | Harrington | |
| 6,178,008 B1 | 1/2001 | Bockman et al. | |
| 6,271,936 B1 | 8/2001 | Yu et al. | |
| 6,483,606 B1 | 11/2002 | Klassen et al. | |
| 6,535,635 B1 | 3/2003 | Klassen et al. | |

FOREIGN PATENT DOCUMENTS

| | | |
|---|---|---|
| JP | 9307776 | 11/1997 |
| JP | 11010918 A * | 1/1999 |

* cited by examiner

*Primary Examiner*—Kee M. Tung
*Assistant Examiner*—G. F. Cunningham
(74) *Attorney, Agent, or Firm*—Jon M. Dickinson PC; Robert D. Varitz PC

(57) ABSTRACT

A method for processing color-image pixel-data for outputting by a multi-bit (N) color-image output device including the steps of (a) characterizing color-image pixels into N successive, associated scan lines of pixels, which lines are bridged, effectively for processing purposes, by successive N×N pixel groups distributed along the associated scan lines, and (b) for each such pixel group, applying processing to the pixels in the group, including vector error diffusion processing, in a pixel-by-pixel and scan-line-by-scan-line manner employing, cyclically, N different color palettes, one each for the different scan lines—one of which palettes is bi-tonal, and other(s) of which is (are) of a higher bit level up to the level N.

6 Claims, 2 Drawing Sheets

|   | R | G | B |
|---|---|---|---|
| W | — | — | — |
| C | — | — | — |
| M | — | — |   |
| Y |   |   |   |
| C+M |   |   |   |
| C+Y |   |   |   |
| M+Y |   |   |   |
| C,M,Y |   |   |   |

|   | R | G | B |
|---|---|---|---|
| W | — | — | — |
| C | — | — | — |
| $C_I$ | — | — | — |
| $C_{II}$ | — | — |   |
| M | — | — |   |
| $M_I$ | — | — |   |
| $M_{II}$ | — |   |   |
| Y |   |   |   |
| $Y_I$ |   |   |   |
| $C_I+M$ | — | — | — |
| $C_{II}+M$ | — | — | — |
| $C_I+M_I$ | — | — |   |
| $C_I+M_{II}$ |   |   |   |

PATTERNING AND DOT GAIN IMPROVEMENT FOR VECTOR ERROR DIFFUSION

BACKGROUND AND SUMMARY OF THE INVENTION

This invention relates to color-image data preprocessing for color-image printing, and more specifically, to methodology relating to patterning and dot-gain improvements associated with vector error diffusion processing of color-image data which is to be printed by an electro-photographic (EP) engine. As will be seen, preferred practice of the present invention is performed in the context of a multi-color-level EP engine, referred to generally as multi-bit (N) color output device. Such a device is specifically illustrated herein in the form of a 2-bit EP engine.

In the processing of color-image data, error diffusion practice often gives rise to what is known as high-frequency blue noise, like halftone patterning. This behavior usually contributes to undesirable graininess and other patterning problems, such as so-called "melting", or "tailing". Additionally, when a processed result is printed by an EP engine, there is often relatively severe dot-gain which can produce a very undesirable image.

In prior art attempts to deal with these problems, often employed is a thresholding approach which is used to control pixel placement and to avoid undesirable pixel clustering. However, this approach can lead to further undesirable qualities in an image, such as color shifting and other types of unwanted patterning. All of these issues tend to become magnified in a setting where vector error diffusion is performed.

The present invention addresses these issues in a relatively simple, yet significantly effective manner. More specifically, the unique approach to color-image-data pre-processing for printing which is taken by the present invention soidly addresses these issues by using at least two different color palettes to handle color pixel processing. If desired, and as will become apparent to those skilled in the art, more than two different color palettes could be used if desired.

According to a preferred manner of practicing the invention, such practice specifically employs, as illustrated herein, two quite different-character color palettes. One of these palettes is a bi-tonal palette, or look-up table (LUT), and the other is a multi-level (multi-bit), 2-bit palette, or LUT. For illustration purposes, input image-data color space is chosen to be sRGB, and the LUT-converted-to color space is basic CMYK color space for the bi-tonal LUT, and (as will be explained further in detail below) 2-bit C, CI, CII, M, MI, MII, etc. multi-color-level color space for the 2-bit LUT.

Still referring to preferred practice of the invention, a 2×2 4-bit cluster (a half-tone cell) of pixels is chosen to define what are referred to herein, in two different "scan lines", as high-priority and low-priority pixels-two each in each cluster. Scan line number One which, as will be seen, is the upper one of the two scan lines contains the two, designated, high-priority pixels. Scan line number Two, the lower scan line, contains the two, designated, low-priority pixels.

In the practice of this invention, and in relation to the performance of pre-printing vector error diffusion, the high-priority pixels are processed using the multi-level LUT, and low-priority pixels are processed using the bi-tonal LUT.

This use of such differentiated LUTs is a key contribution of the present invention. Implementation of the invention, as suggested earlier, significantly addresses the undesirable EP printing issues which have been mentioned above, and definitively offers improvements relating to image pixel patterning and dot-gain in finally printed color images.

Various other features and advantages which are offered by the invention will become more fully apparent as the detailed description which follow is read in conjunction with the accompanying drawings.

DESCRIPTION OF THE DRAWINGS

FIG. 4 schematically illustrates a bi-tonal color palette, or LUT, employed in the diagram of FIG. 3.

FIG. 5 illustrates, fragmentarily and schematically, a multi-color-level, 2-bit color palette, or LUT, also employed in the diagram of FIG. 3.

DETAILED DESCRIPTION OF THE INVENTION

Figure 1:
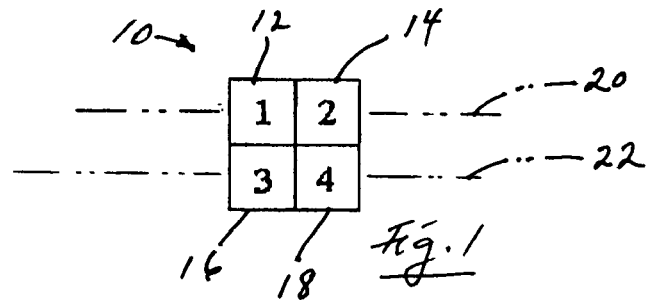
FIG. 1 illustrates a 2×2 half-tone cell (pixel cluster) with pixel positions numbered to assist in describing priority as such a concept is employed herein.
Figure 2:
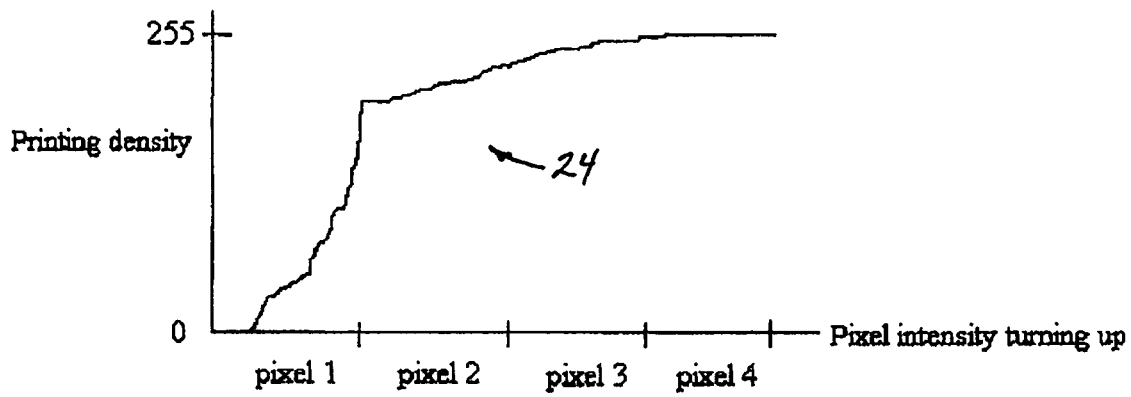
FIG. 2 presents a representation of a typical tone reproduction curve relating to a cell like that shown in FIG. 1 for a typical multi-color-level (2-bit) EP engine.

Turning now to the drawings, and referring first of all to FIGS. 1 and 2, indicated generally at 10 in FIG. 1 is a 2×2 halftone cell pixel group, or cluster, including four pixels which are position-numbered 1, 2, 3, and 4. This group of pixels, which is also referred to herein as an N×N group, forms part of the data for a color image which is to be processed in accordance with practice of the invention as such will be described herein. The four pixels which are thus position-numbered 1, 2, 3, and 4 are also designated herein by reference numerals 12, 14, 16, 18, respectively. Pixels 12 and 14 lie along what is referred to herein as a first scan line 20, and pixels 16 and 18 lie along what is referred to as a second scan line 22. Pixels 12 and 14 are referred to also as being high-priority pixels, and pixels 16 and 18 as being low-priority pixels, in group 10.

As was suggested earlier, the preferred implementation of the present invention is illustrated with respect to supplying processed color-image pixel data to an EP engine, and a very convenient and preferred manner of addressing this approach has been found to involve utilizing a halftone cell pixel group, such as group 10, as a foundation model for invoking the various stages, soon to be described, of pixel-data processing. Those skilled in the art will recognize that, instead of using a 2×2 halftone cell group, such as group 10, it is entirely possible to use different N×N cell groups, such as a 3×3 group, a 4×4 group, etc. How the steps, practice and implementation of the present invention can be designed to deal with these other kinds of selectable cell groups will be completely evident to those generally skilled in this art on reading and reviewing the now unfolding disclosure of the present invention implementation.

Turning attention for a moment to FIG. 2, here what is shown is a tone reproduction curve 24 of a 2×2 halftone cell, such as cell 10, for a typical multi-level, multi-color EP engine. From this curve, one can see that, with respect to pixels in positions numbered 1, 2, 3, and 4 in FIG. 1, (a) the pixel in position number 1 (12) is typically handled to be "turned on" to a level of about 80% of grey level, (b) the pixel in position number 2 (14) receives about another 10% of grey level, and (c) the remaining two pixels in positions numbers 3 and 4 (16, 18) collectively receive about 10% or less of grey level "turn on". Those skilled in the art or fully aware of these phenomena.

Accordingly, and as was mentioned just above, pixels 12, 14, which lie in pixel positions 1 and 2 in cell 10, are treated as being the high-priority pixels in cell 10, and therefore receive the principal level of "turn on", while pixels in positions 3 and 4 (16, 18), the low-priority pixels, will most likely not be "turned on", but rather be left essentially white (in most instances).

This high and low prioritization of the four pixels in an N×N group, such as that illustrated at 10 in FIG. 1, is employed, in accordance with practice of this invention, to define the specific selection of one of two different color palettes to be used during preprinting processing. More specifically, where a 2×2 pixel group, such as is now being discussed, is selected to provide the foundation for color-image pixel-data processing, two different color palettes will be (and are herein illustrated to be) employed, one for the high-priority pixels, and the other for the low-priority pixels, in each N×N cell group. High-priority pixels are processed utilizing a multi-level color palette, or LUT—in this case at 2-bit color palette—and low-priority pixels are processed utilizing a bi-tonal color palette, or LUT. Thus, pixels in scan line One (line 20) are processed with a multi-level LUT, and pixels in scan line Two (line 22) are processed utilizing the mentioned bi-tonal LUT.

As the entire data for a color image is processed, effectively that data is recognized in terms of successive pairs of scan lines One and Two, with processing taking place along each such pair of scan lines by progressing successively through adjacent 2×2 groups of pixels like those shown in group 10 in FIG. 1. When processing for a given adjacent pair of scan lines has been completed, the process continues with a next successive pair of scan lines One and Two, and so on, until the entire image data file has been handled.

Figure 3:
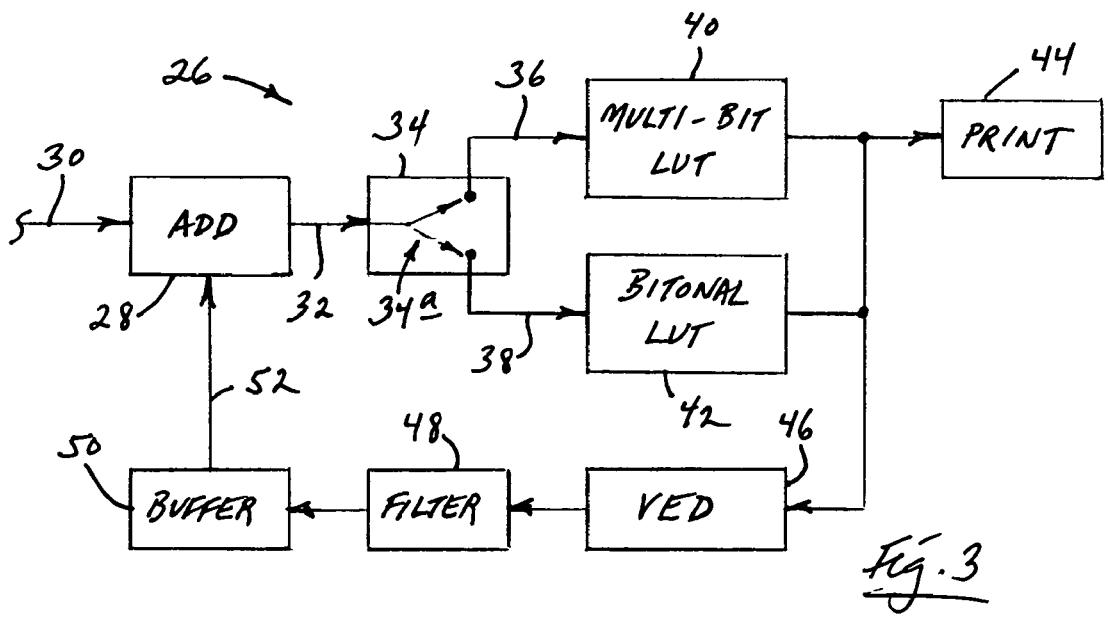
FIG. 3 is a block/schematic diagram which illustrates a preferred and best-mode implementation and manner of practicing the present invention.

Turning attention now to FIG. 3, here, shown generally at 26 is a block/schematic diagram that pictures a preferred and best mode manner of implementing and practicing the high-priority, low-priority pixel processing which has just generally been described with reference to FIGS. 1 and 2.

Included in the diagram of FIG. 3 is a block 28 which receives, as indicated by a fragmented arrow 30, input color-space pixel-image color data delivered in any suitable manner, and for illustration purposes herein, in sRGB color space. It is within block 28 that pre-calculated vector error diffusion "corrections" are added to incoming pixel data, pixel-by-pixel, and resulting output pixel data information is furnished, as indicated by an arrow 32, to a block 34 which can be visualized as a switching block. A "switch" 34a is schematically illustrated inside of block 34, which switch selectively delivers pixel data to one of two different outputs, represented by arrows 36, 38, which, respectively, feed information to two different color palettes, or LUTs, including a multi-bit (herein a 2-bit) palette, or LUT, 40, and a bi-tonal color palette, or LUT, 42. High-priority pixels in positions 1 and 2, as pictured in FIG. 1 along scan line 20 are delivered to LUT 40, and low-priority pixels in positions 3 and 4 along scan line 22, the second scan line as illustrated in FIG. 1, are supplied to bi-tonal LUT 42.

The output sides of tables 40, 42 are connected each to a multi-color-level, multi-bit printer, or image output device, 44, and also to a block 46, labeled "VED", wherein vector error diffusion processing takes place in a well understood and relatively conventional manner. Output information from block 46 is fed through a conventional error filter 48 to an error buffer 50. Information made available in buffer 50 is supplied, as indicated by an arrow 52, to ADD block 28, wherein the earlier-mentioned vector error diffusion corrections are added to incoming pixel data.

Appropriate software, the details of which form no part of the present invention, and which can take a number of different forms creatable well within the skills of those skilled in the art, is employed in accordance with the organization pictured in FIG. 3 to control the operation of block 34 so as to feed, appropriately, scan line One and scan line Two high-priority and low-priority pixel data to LUTs 41, 42. This is done, as generally described above, in a cyclic and recurrent fashion as required in accordance with practice of the invention.

FIG. 4 at 52, and FIG. 5 at 54, illustrate schematically the general organizations of palettes, or LUTs, 40, 42, respectively. Table 52 is a bi-tonal table which, for printer 44, relates bi-tonal output colors producible by the printer with the appropriately valued sRGB input pixels (converted to CMYK values) arriving at the printer. Specific table values are not presented in table 52, but rather are illustrated only schematically by short horizontal lines, such as the two shown at 52a.

Multi-level (2-bit) LUT 54, also prepared for operation with respect to printer 44, relates incoming sRGB pixel values with each of the available 2-bit multi-level (C, CI, CII, etc.) output colors producible by printer 44. Again, specific table values are not shown in table 54, but rather are represented by short horizontal lines, such as the two shown at 54a in FIG. 5. The "structures" of tables 52, 54 need not be discussed further in detail, inasmuch as their characteristics are well understood by those generally skilled in this art.

During processing of color-image pixel data in accordance with practice of this invention, and in relation to the practice of addressing pixels in clusters of 2×2 as explained herein, in each cluster, and one after another, pixels in positions numbers 1 and 2, as illustrated in FIG. 1—the scan line One pixels in group 10—are successively fed into the system through blocks 28, 34 to multi-bit LUT 40. Similarly, successive bits in positions 3 and 4 in cell 10, as pictured in FIG. 1, are fed into the system through blocks 28, 34 to bi-tonal LUT 42. As each pixel is "supplied" to its respective, associated LUT, what is thereafter otherwise conventional processing takes place to determine, with respect to each so-presented pixel, which of the sRGB color values that occupy the associated table possesses the "closest distance" (a vector difference) to the presented-pixel's color values. The well-known equation for determining this distance is:

$$\Delta E = [\Delta R^2 + \Delta G^2 + \Delta B^2]^{1/2}$$

Whichever set of LUT color values is found to resolve this closest-distance question determines the color of the pixel which will be output (delivered) to multi-level printer 44, as indicated in FIG. 3.

This LUT operation is what takes place with respect to pixels presented in each of the two different palettes employed in this preferred implementation of the present invention.

Experience and practice with this invention has shown that the approach of employing plural color palettes, or look up tables, in relation to the cluster size of pixels, and the number of scan lines that have been selected for processing, produces EP-engine printed-output color images which significantly minimize the imaging problems mentioned earlier herein. And, as has been pointed out, while the preferred manner of practicing the invention has been described herein in conjunction with a 2×2 cluster of pixels, other cluster numbers could also be employed if desired.

Thus, practice of the invention can be described as involving a method for processing color-image pixel data for outputting by a multi-bit (N) color output device which includes the steps of (a) characterizing color-image pixels into N successive, associated scan lines of pixels which are bridged, effectively for processing purposes, by successive, N×N pixel groups that are distributed along the associated scan lines, and (b) for each such pixel group, applying processing to the pixels, including vector error diffusion processing, in a pixel-by-pixel and scan-line-by-scan-line manner employing, cyclically, N different color palettes, one each for the different scan lines, with one of these palettes being a bi-tonal palette, and the palette being a higher bit-level palette, up to the level N. In the practice of this method, pixels in the first scan line are processed in relation to the higher-bit-level color palette, and pixels in the second scan line are processed in relation to the bi-tonal color palette. Where a pixel group selected is larger than 2×2, say, for example, N×N where N>2, such a group is referred to herein as being related to "first-to-N" scan lines.

Another manner of expressing practice of the methodology of this invention is that it can be viewed as a method for processing color-image pixel data for outputting by a multi-bit color output device, with this method including the steps of (a) providing at least two different color palettes for employment during processing, one of which palettes is bi-tonal in nature and the other of which is multi-bit in nature, and (b) implementing processing in a manner whereby these different color palettes are employed in a selected, one-after-another fashion.

Still another way of viewing the methodology of the present invention is to see it as a method for vector error diffusion processing of color-image pixel data for outputting by a multi-bit, color-image output device, including the steps of (a) recognizing different pixel image positions in a color image to be processed, and (b) thereafter using selected, different color palettes for pixels in selected, different image positions in that image.

Accordingly, while a preferred embodiment, and certain suggested potential modifications, of the invention and of its practice, have been described and illustrated herein, it is appreciated that other variations and modifications may be made which come well within the scope of the present invention.

I claim:

1. A method for processing color-image pixel-data for outputting by a multi-bit (N) color-image output device comprising characterizing color-image pixels into N successive, associated scan lines of pixels, with respect to the result of said characterizing, effectively bridging the N associated scan lines to create for processing purposes, successive N×N pixel groups distributed along these lines, and for each such pixel group, applying processing to the pixels in the group, including vector error diffusion processing, in a pixel-by-pixel and scan-line-by-scan-line manner employing, cyclically, N different color palettes, one each for the different scan lines, and one of which palettes is bi-tonal, and other(s) of which is (are) of a higher bit level up to the level N.

2. The method of claim 1, wherein, within each pixel group, there are first-to-N scan lines, and pixels in the first scan line are vector error diffusion processed employing a higher bit-level color palette, and pixels in the next scan line(s) is (are) processed employing a lower bit-level color palette.

3. The method of claim 1 which further includes providing at least two different color palettes for employment during said processing, one of which color palettes is bi-tonal, and the other of which is multi-bit in a manner whereby such different color palettes are used in a selected, one-after-another fashion.

4. The method of claim 1 which further includes recognizing different pixel image positions in each of the mentioned, created pixel groups, and using selected, different color palettes for pixels in selected, different image positions within each such group.

5. The method of claim 4, wherein such different color palettes are employed each for a different scan line.

6. The method of claim 5, wherein (a) said characterizing results in two scan lines being used, which two scan lines are recognized, respectively, as first and second scan lines, and in an alternating manner, and (b) a multi-level color palette is employed for pixels in each first scan line, and a bi-tonal color palette is employed for pixels in each second scan line.

* * * * *